United States Patent
Park et al.

(10) Patent No.: US 9,143,970 B2
(45) Date of Patent: Sep. 22, 2015

(54) METHOD AND APPARATUS FOR RECEIVING A TIMING ADVANCE COMMAND IN A WIRELESS COMMUNICATION SYSTEM

(75) Inventors: Sung Jun Park, Gyeongki-do (KR);
Sung Duck Chun, Gyeongki-do (KR);
Sung Hoon Jung, Gyeongki-do (KR);
Seung June Yi, Gyeongki-do (KR);
Young Dae Lee, Gyeongki-do (KR)

(73) Assignee: LG Electronics Inc., Seoul (KR)

( * ) Notice: Subject to any disclaimer, the term of this patent is extended or adjusted under 35 U.S.C. 154(b) by 118 days.

(21) Appl. No.: 13/520,207

(22) PCT Filed: Jan. 7, 2011

(86) PCT No.: PCT/KR2011/000111
§ 371 (c)(1),
(2), (4) Date: Jul. 2, 2012

(87) PCT Pub. No.: WO2011/084005
PCT Pub. Date: Jul. 14, 2011

(65) Prior Publication Data
US 2012/0281628 A1    Nov. 8, 2012

Related U.S. Application Data

(60) Provisional application No. 61/293,185, filed on Jan. 7, 2010.

(30) Foreign Application Priority Data

Jan. 5, 2011    (KR) ........................ 10-2011-0001072

(51) Int. Cl.
H04W 4/00      (2009.01)
H04W 24/10     (2009.01)
H04J 11/00     (2006.01)

(52) U.S. Cl.
CPC ........... *H04W 24/10* (2013.01); *H04J 11/0079* (2013.01)

(58) Field of Classification Search
CPC ............ H04W 56/001; H04W 56/004; H04W 56/0005; H04W 56/0045; H04W 72/0406; H04W 72/042; H04W 72/121; H04W 74/0833
USPC ............................ 370/328–341, 350; 455/450
See application file for complete search history.

(56) References Cited

U.S. PATENT DOCUMENTS

2006/0073836 A1    4/2006 Laroia et al.
2008/0043671 A1    2/2008 Moon et al.
(Continued)

FOREIGN PATENT DOCUMENTS

KR    10-2009-0098421 A    9/2009

OTHER PUBLICATIONS

International Search Report issued in PCT/KR2011/000111 dated Sep. 27, 2011.

*Primary Examiner* — Kan Yuen
(74) *Attorney, Agent, or Firm* — Morgan, Lewis & Bockius LLP (57) ABSTRACT

The present invention provides a method of receiving a timing advance command by a user equipment in a wireless communication system. A terminal receives information on a time advance group from a base station, and also receives the timing advance command corresponding to the time advance group from the base station.

13 Claims, 12 Drawing Sheets

(56) References Cited

U.S. PATENT DOCUMENTS

2009/0232107 A1    9/2009  Park et al.
2009/0285237 A1*  11/2009  Chun et al. .................... 370/474
2010/0118893 A1*   5/2010  Lee et al. ...................... 370/474
2010/0238908 A1*   9/2010  Wu ................................ 370/336
2011/0158116 A1*   6/2011  Tenny et al. ................... 370/252
2012/0147810 A1*   6/2012  Wang et al. .................... 370/315
2013/0010619 A1*   1/2013  Fong et al. ..................... 370/252
2013/0051214 A1*   2/2013  Fong et al. ..................... 370/216

* cited by examiner

(A) R/R/E/LCID/F/L sub-header with 7-bit L field (B) R/R/E/LCID/F/L sub-header with 15-bit L field (C) R/R/E/LCID sub-header

| Time Alignment Group ID | | | Oct1 |
|---|---|---|---|
| R | R | 1st Time Alignment Value | Oct2 |
| R | R | 2nd Time Alignment Value | Oct3 |

METHOD AND APPARATUS FOR RECEIVING A TIMING ADVANCE COMMAND IN A WIRELESS COMMUNICATION SYSTEM

This is a U.S. National Phase Entry of PCT Application No. PCT/KR2011/000111, filed Jan. 7, 2011, and claims the benefit of Korean Patent Application No. 10-2011-0001072 filed Jan. 5, 2011 and claims the benefit of U.S. Provisional Application No. 61/293,185 filed Jan. 7, 2010.

TECHNICAL FIELD

The present invention relates to wireless communications, and more particularly, to a method of receiving a timing advance command and a method of transmitting the timing alignment command in a wireless communication system.

BACKGROUND ART

3rd generation partnership project (3GPP) long term evolution (LTE) is an improved version of a universal mobile telecommunication system (UMTS) and is introduced as the 3GPP release 8. The 3GPP LTE uses orthogonal frequency division multiple access (OFDMA) in a downlink, and uses single carrier-frequency division multiple access (SC-FDMA) in an uplink. The 3GPP LTE employs multiple input multiple output (MIMO) having up to four antennas. In recent years, there is an ongoing discussion on 3GPP LTE-advanced (LTE-A) that is an evolution of the 3GPP LTE.

The 3GPP LTE-A employs various techniques such as carrier aggregation, relay, etc. The 3GPP LTE system is a single carrier system supporting only one bandwidth (i.e., one component carrier) among {1.4, 3, 5, 10, 15, 20} MHz. On the other hand, the LTE-A employs multiple carriers using carrier aggregation. The component carrier is defined with a center frequency and a bandwidth. The component carrier may correspond to one cell. A multiple carrier system uses a plurality of component carriers having a narrower bandwidth than a full bandwidth.

To decrease interference caused by uplink transmission between user equipments (UEs), it is important for a base station (BS) to maintain uplink time alignment of the UEs. The UE may be located in any area in a cell. An uplink signal transmitted by the UE may arrive to the BS at a different time according to the location of the UE. A signal arrival time of a UE located in a cell edge is longer than a signal arrival time of a UE located in a cell center. On the contrary, the signal arrival time of the UE located in the cell center is shorter than the signal arrival time of the UE located in the cell edge.

To decrease interference between the UEs, the BS needs to performing scheduling so that uplink signals transmitted by the UEs in the cell can be received within a boundary every time. The BS has to properly regulate transmission timing of each UE according to a situation of each UE. Such a regulation is called maintenance of time alignment.

As multiple carriers are introduced, uplink time alignment needs to be maintained in each component carrier (or serving cell). A signaling overhead for maintaining the uplink time alignment may increase in proportion to the number of component carriers.

Accordingly, there is a need for a method of maintaining uplink time alignment for a plurality of component carriers.

DISCLOSURE

Technical Problem

The present invention provides a method and apparatus for receiving a timing alignment command for a plurality of serving cells.

The present invention also provides a method and apparatus for transmitting a timing alignment command for a plurality of serving cells.

Technical Solution

In an aspect, a method of receiving a timing advance command by a user equipment in a wireless communication system is provided. The method includes receiving information regarding a time alignment group from a base station, and receiving the timing advance command corresponding to the time alignment group from the base station.

The method may further includes applying the timing advance command to at least one serving cell belonging to the time alignment group.

The information regarding the time alignment group may include information regarding a time alignment group identifier.

The timing advance command may be received together with the time alignment group identifier.

The time alignment group identifier may be a logical channel identifier.

The time alignment group identifier may be included in a medium access control (MAC) control element (CE).

The time alignment group identifier may be included in a MAC sub-header.

The time alignment group may be determined based on a serving cell in which the timing advance command is received.

The step of applying of the timing advance command to the at least one serving cell belonging to the time alignment group may include restarting an uplink alignment timer for the time alignment group.

The timing advance command may be for uplink time alignment.

In another aspect, a method of transmitting a timing advance command by a base station in a wireless communication system is provided. The method includes transmitting information regarding a time alignment group to a user equipment, and transmitting the timing advance command corresponding to the time alignment group to the user equipment.

Advantageous Effects

A plurality of serving cells are grouped, and the same uplink time alignment value is applied to each group. A signaling overhead for maintaining uplink time alignment between a base station and a user equipment can be decreased.

MODE FOR INVENTION

Figure 1:
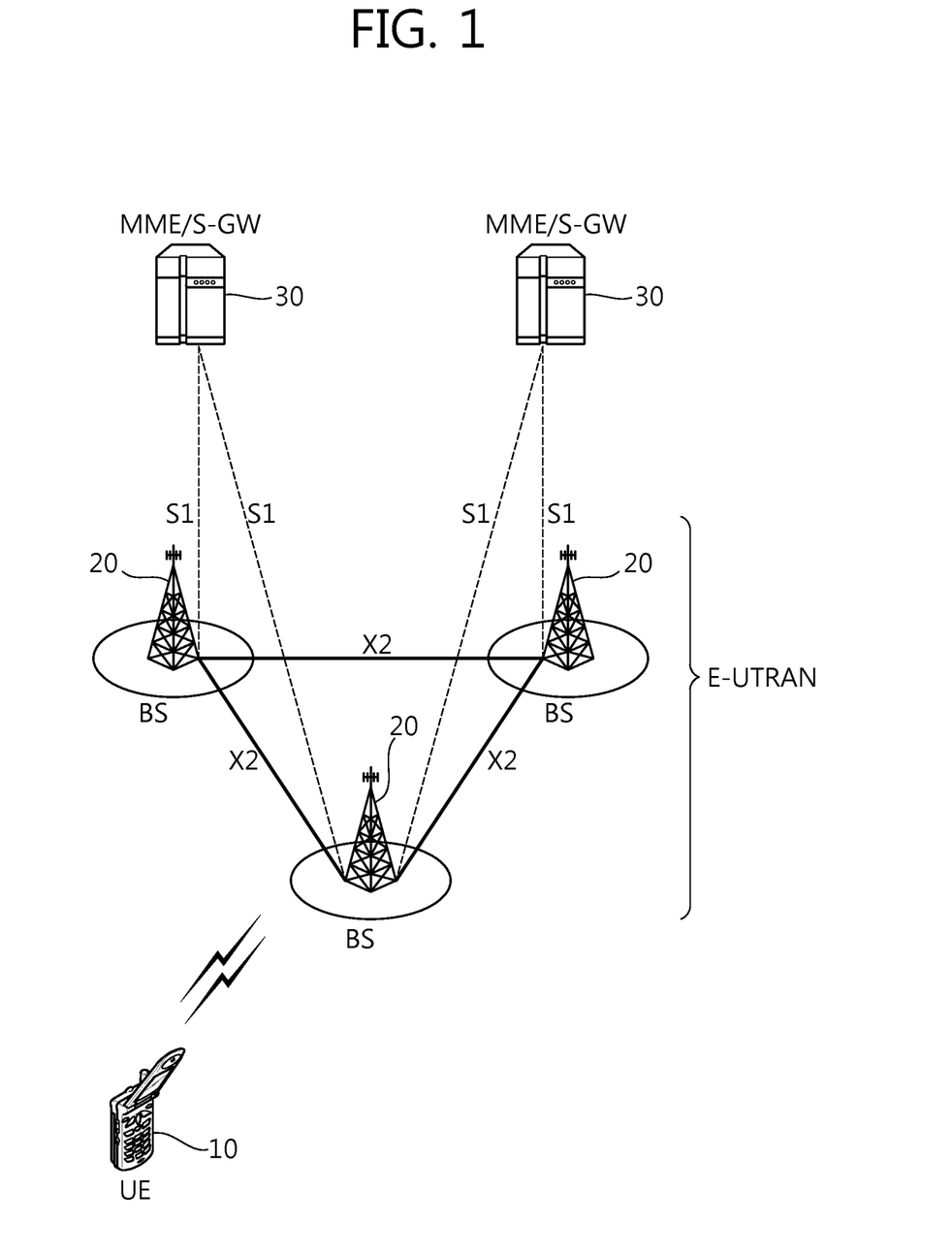
FIG. 1 shows a wireless communication system to which the present invention is applied.

FIG. 1 shows a wireless communication system to which the present invention is applied. The wireless communication system may also be referred to as an evolved-UMTS terrestrial radio access network (E-UTRAN) or a long term evolution (LTE)/LTE-A system.

The E-UTRAN includes at least one base station (BS) 20 which provides a control plane and a user plane to a user equipment (UE) 10. The UE 10 may be fixed or mobile, and may be referred to as another terminology, such as a mobile station (MS), a user terminal (UT), a subscriber station (SS), a mobile terminal (MT), a wireless device, etc. The BS 20 is generally a fixed station that communicates with the UE 10 and may be referred to as another terminology, such as an evolved node-B (eNB), a base transceiver system (BTS), an access point, etc.

The BSs 20 are interconnected by means of an X2 interface. The BSs 20 are also connected by means of an S1 interface to an evolved packet core (EPC) 30, more specifically, to a mobility management entity (MME) through S1-MME and to a serving gateway (S-GW) through S1-U.

The EPC 30 includes an MME, an S-GW, and a packet data network-gateway (P-GW). The MME has access information of the UE or capability information of the UE, and such information is generally used for mobility management of the UE. The S-GW is a gateway having an E-UTRAN as an end point. The P-GW is a gateway having a PDN as an end point.

A radio interface between the UE and the BS is called a Uu interface. Layers of a radio interface protocol between the UE and the network can be classified into a first layer (L1), a second layer (L2), and a third layer (L3) based on the lower three layers of the open system interconnection (OSI) model that is well-known in the communication system. Among them, a physical (PHY) layer belonging to the first layer provides an information transfer service by using a physical channel, and a radio resource control (RRC) layer belonging to the third layer serves to control a radio resource between the UE and the network. For this, the RRC layer exchanges an RRC message between the UE and the BS.

Figure 2:
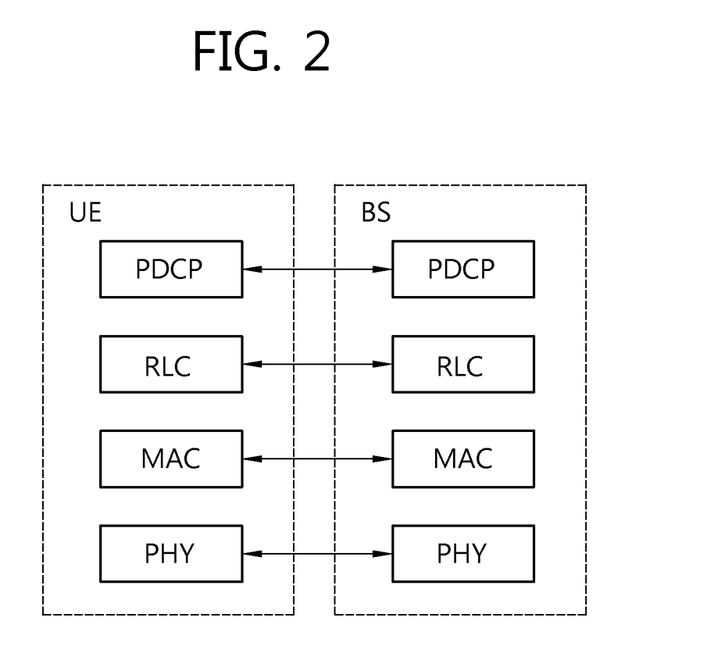
FIG. 2 is a diagram illustrating a radio protocol architecture for a user plane.
Figure 3:
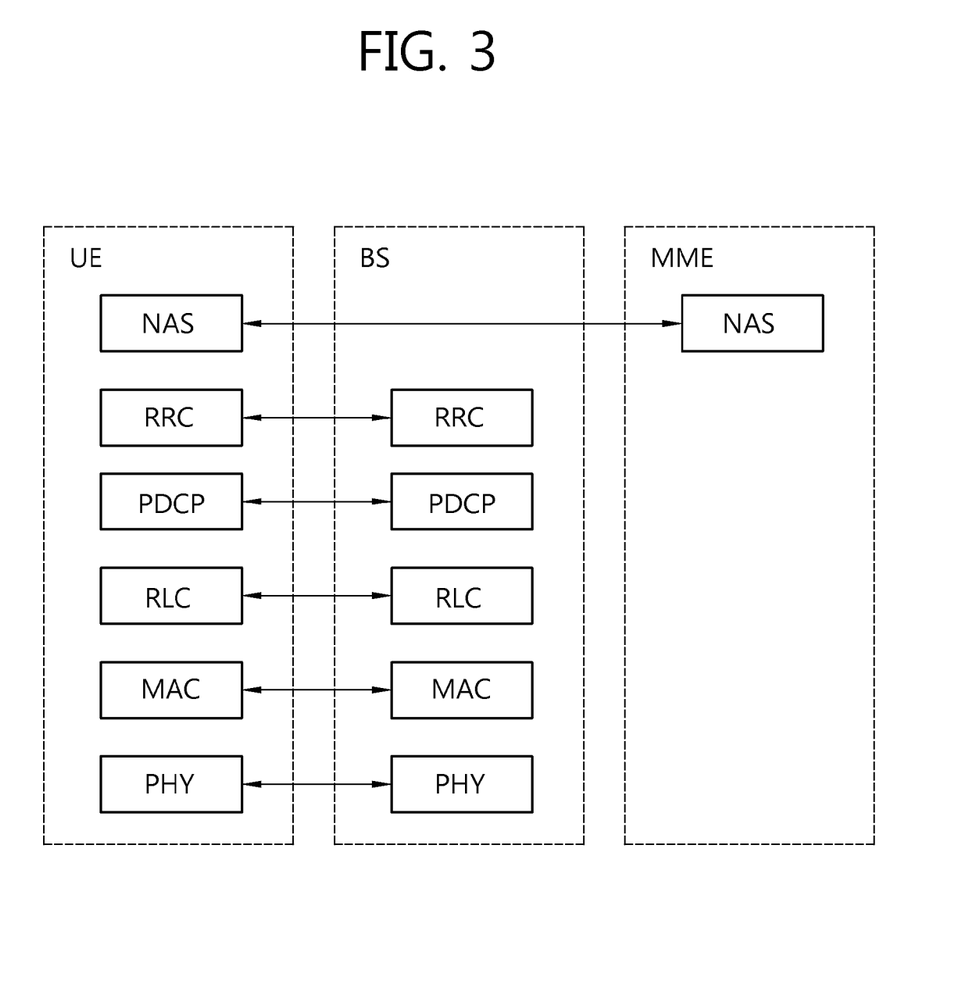
FIG. 3 is a diagram illustrating a radio protocol architecture for a control plane.

FIG. 2 is a diagram illustrating a radio protocol architecture for a user plane. FIG. 3 is a diagram illustrating a radio protocol architecture for a control plane. The user plane is a protocol stack for user data transmission. The control plane is a protocol stack for control signal transmission.

Referring to FIGS. 2 and 3, a PHY layer provides an upper layer with an information transfer service through a physical channel. The PHY layer is connected to a medium access control (MAC) layer which is an upper layer of the PHY layer through a transport channel. Data is transferred between the MAC layer and the PHY layer through the transport channel. The transport channel is classified according to how and with what characteristics data is transmitted through a radio interface.

Between different PHY layers, i.e., a PHY layer of a transmitter and a PHY layer of a receiver, data are transferred through the physical channel. The physical channel is modulated using an orthogonal frequency division multiplexing (OFDM) scheme, and utilizes time and frequency as a radio resource.

A function of the MAC layer includes mapping between a logical channel and a transport channel and multiplexing/demultiplexing on a transport block provided to a physical channel over a transport channel of a MAC service data unit (SDU) belonging to the logical channel. The MAC layer provides a service to a radio link control (RLC) layer through the logical channel.

A function of the RLC layer includes RLC SDU concatenation, segmentation, and reassembly. To ensure a variety of quality of service (QoS) required by a radio bearer (RB), the RLC layer provides three operation modes, i.e., a transparent mode (TM), an unacknowledged mode (UM), and an acknowledged mode (AM). The AM RLC provides error correction by using an automatic repeat request (ARQ).

Functions of a packet data convergence protocol (PDCP) layer in the user plane include user data delivery, header compression, and ciphering. Functions of a PDCP layer in the control plane include control-plane data delivery and ciphering/integrity protection.

A radio resource control (RRC) layer is defined only in the control plane. The RRC layer serves to control the logical channel, the transport channel, and the physical channel in association with configuration, reconfiguration and release of radio bearers (RBs).

An RB is a logical path provided by the first layer (i.e., the PHY layer) and the second layer (i.e., the MAC layer, the RLC layer, and the PDCP layer) for data delivery between the UE and the network. The configuration of the RB implies a process for specifying a radio protocol layer and channel properties to provide a particular service and for determining respective detailed parameters and operations. The RB can be classified into two types, i.e., a signaling RB (SRB) and a data RB (DRB). The SRB is used as a path for transmitting an RRC message in the control plane. The DRB is used as a path for transmitting user data in the user plane.

When an RRC connection is established between an RRC layer of the UE and an RRC layer of the network, the UE is in an RRC connected state, and otherwise the UE is in an RRC idle state.

Data is transmitted from the network to the UE through a downlink transport channel. Examples of the downlink transport channel include a broadcast channel (BCH) for transmitting system information and a downlink-shared channel (SCH) for transmitting user traffic or control messages. The user traffic of downlink multicast or broadcast services or the control messages can be transmitted on the downlink-SCH or an additional downlink multicast channel (MCH). Data are transmitted from the UE to the network through an uplink transport channel. Examples of the uplink transport channel include a random access channel (RACH) for transmitting an initial control message and an uplink SCH for transmitting user traffic or control messages.

Examples of logical channels belonging to a higher channel of the transport channel and mapped onto the transport channels include a broadcast channel (BCCH), a paging control channel (PCCH), a common control channel (CCCH), a multicast control channel (MCCH), a multicast traffic channel (MTCH), etc.

Now, maintenance of uplink time alignment of 3GPP LTE will be described.

To decrease interference caused by uplink transmission between UEs, it is important for a BS to maintain uplink time alignment of the UEs. The UE may be located in any area in a cell. An uplink signal transmitted by the UE may arrive to the BS at a different time according to the location of the UE. A signal arrival time of a UE located in a cell edge is longer than a signal arrival time of a UE located in a cell center. On the contrary, the signal arrival time of the UE located in the cell center is shorter than the signal arrival time of the UE located in the cell edge.

To decrease interference between the UEs, the BS needs to performing scheduling so that uplink signals transmitted by the UEs in the cell can be received within a boundary every time. The BS has to properly regulate transmission timing of each UE according to a situation of each UE. Such a regulation is called maintenance of time alignment.

A random access procedure is one of methods for managing time alignment. The UE transmits a random access preamble to the BS. The BS calculates a time alignment value for advancing or delaying transmission timing of the UE on the basis of the received random access preamble. In addition, the BS transmits a random access response including the calculated time alignment value to the UE. The UE updates the transmission timing by using the time alignment value.

In another method, the BS receives a sounding reference signal from the UE periodically or randomly, calculates the time alignment value of the UE by using the sounding reference signal, and reports a MAC control element (CE) to the UE.

The time alignment value sent by the BS to the UE to maintain uplink time alignment is called a timing alignment command or a timing advance command.

Since the UE has mobility in general, the transmission timing of the UE varies depending on a moving speed, a location, or the like of the UE. Therefore, the time alignment value received by the UE is preferably valid during a specific time period. For this, a time alignment timer is used.

When time alignment is updated after receiving the time alignment value from the BS, the UE starts or restarts the time alignment timer. The UE can perform uplink transmission only when the time alignment timer is running. A value of the time alignment timer may be reported by the BS to the UE by using system information or an RRC message such as a radio bearer reconfiguration message.

When the time alignment timer expires or when the time alignment timer does not run, the UE does not transmit any uplink signal except for the random access preamble under the assumption that time alignment is not achieved between the BS and the UE.

Figure 7:
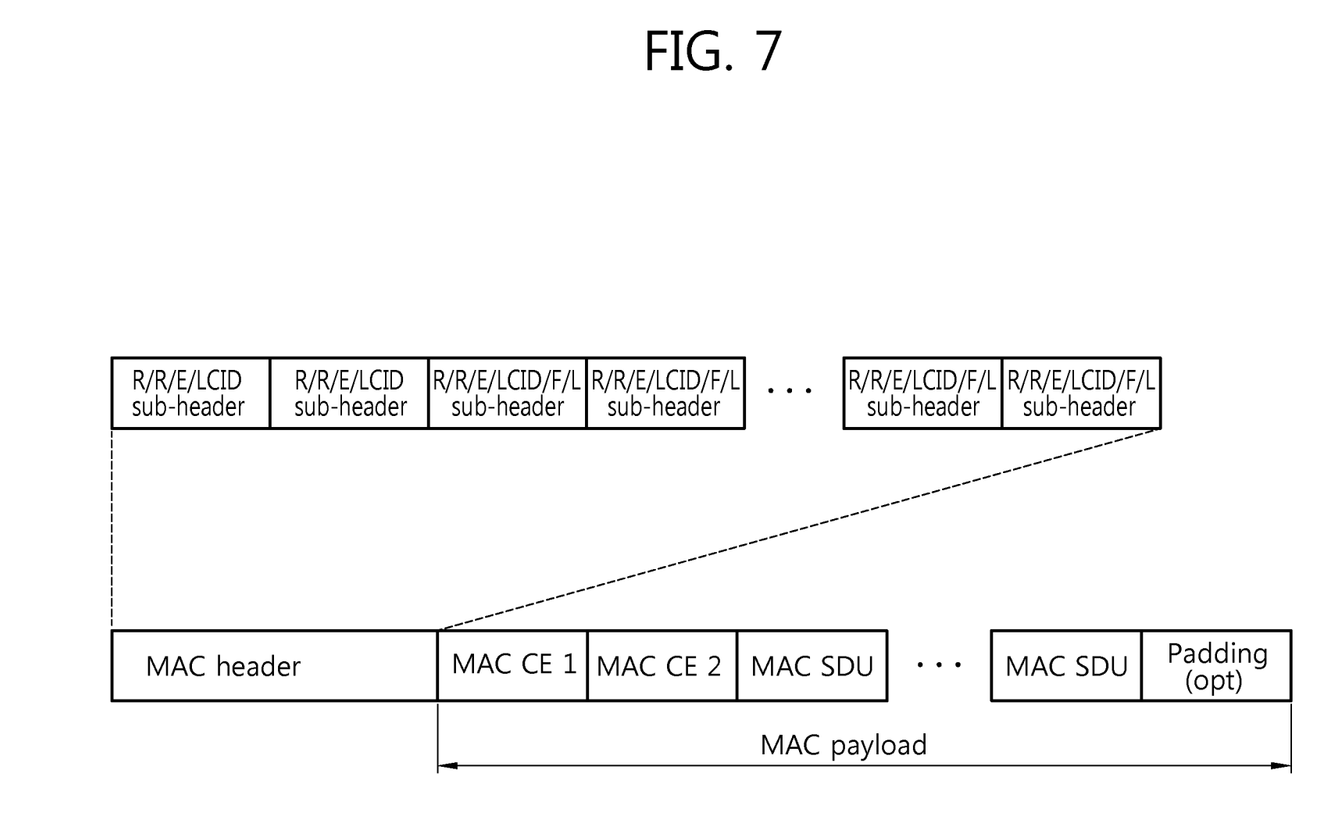
FIG. 7 shows a structure of a medium access control (MAC) protocol data unit (PDU) in 3rd generation partnership project (3GPP) long term evolution (LTE).

FIG. 7 shows a structure of a MAC PDU in 3GPP LTE.

The MAC PDU includes a MAC header, a MAC control element (CE), and at least one MAC service data unit (SDU). The MAC header includes at least one sub-header. Each sub-header corresponds to the MAC CE and the MAC SDU. The sub-header has the same length and property as the MAC CE and the MAC SDU. The MAC SDU is a data block provided from a higher layer (e.g., an RLC layer or an RRC layer) of a MAC layer. The MAC CE is used to deliver control information of the MAC layer such as a buffer status report.

Figure 8:
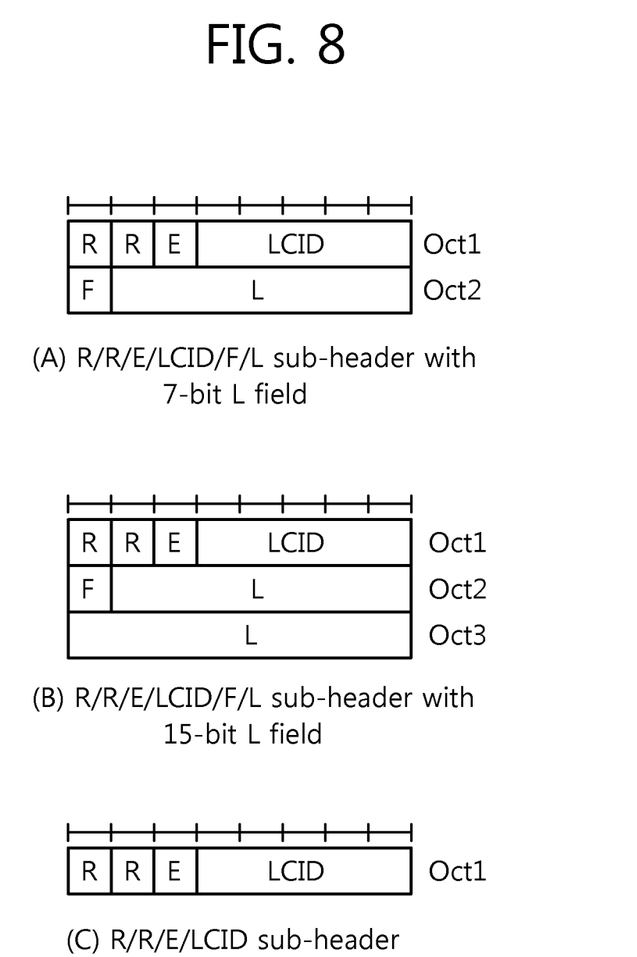
FIG. 8 shows various examples of a MAC sub-header.

FIG. 8 shows various examples of a MAC sub-header. Descriptions on each field are as follows.

R (1 bit): A reserved field.

E (1 bit): An extended field. It indicates whether there are F and L fields in a next field.

LCID (5 bit): A logical channel ID field. It indicates a type of the MAC CE or a specific logical channel to which the MAC SDU belongs.

F (1 bit): A format field. It indicates whether a next L field has a size of 7 bits or 15 bits.

L (7 or 15 bit): A length field. It indicates a length of the MAC CE or MAC SDU corresponding to the MAC sub-header.

The F and L fields are not included in a MAC sub-header corresponding to a fixed-sized MAC CE.

(A) and (B) of FIG. 8 show exemplary structures of a MAC sub-header corresponding to a variable-sized MAC CE and MAC SDU. (C) of FIG. 8 shows an exemplary structure of a MAC sub-header corresponding to a fixed-sized MAC CE.

Now, a multiple carrier system will be described.

A 3GPP LTE system supports a case where a downlink bandwidth and an uplink bandwidth are set differently under the premise that one component carrier (CC) is used. The CC is defined with a center frequency and a bandwidth. This implies that the 3GPP LTE is supported only when the downlink bandwidth and the uplink bandwidth are identical or different in a situation where one CC is defined for each of a downlink and an uplink. For example, the 3GPP LTE system supports up to 20 MHz and the uplink bandwidth and the downlink bandwidth may be different from each other, but supports only one CC in the uplink and the downlink.

Spectrum aggregation (or bandwidth aggregation, also referred to as carrier aggregation) supports a plurality of CCs. The spectrum aggregation is introduced to support an increasing throughput, to prevent a cost increase caused by using a broadband radio frequency (RF) element, and to ensure compatibility with legacy systems.

Figure 4:
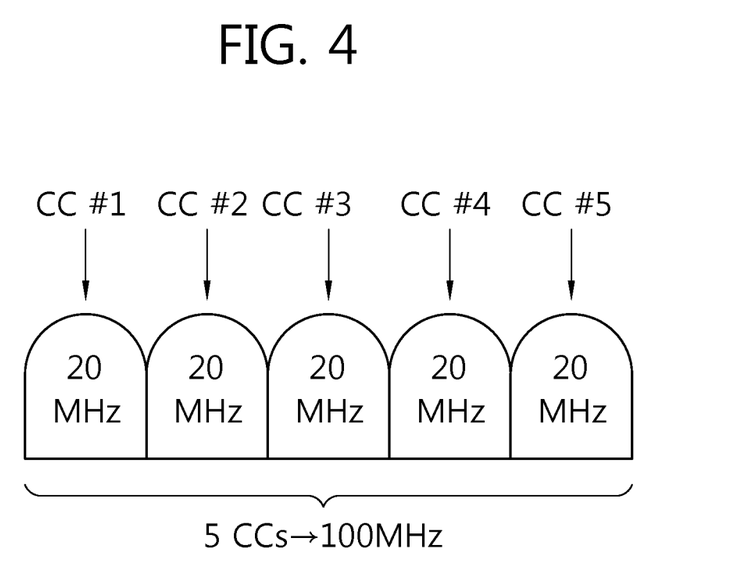
FIG. 4 shows an example of multiple carriers.

FIG. 4 shows an example of multiple carriers. There are five CCs, i.e., CC #1, CC #2, CC #3, CC #4, and CC #5, each of which has a bandwidth of 20 MHz. Therefore, if the five CCs are allocated in a granularity of a CC unit having the bandwidth of 20 MHz, a bandwidth of up to 100 MHz can be supported.

The bandwidth of the CC or the number of the CCs are exemplary purposes only. Each CC may have a different bandwidth. The number of downlink CCs and the number of uplink CCs may be identical to or different from each other.

Figure 5:
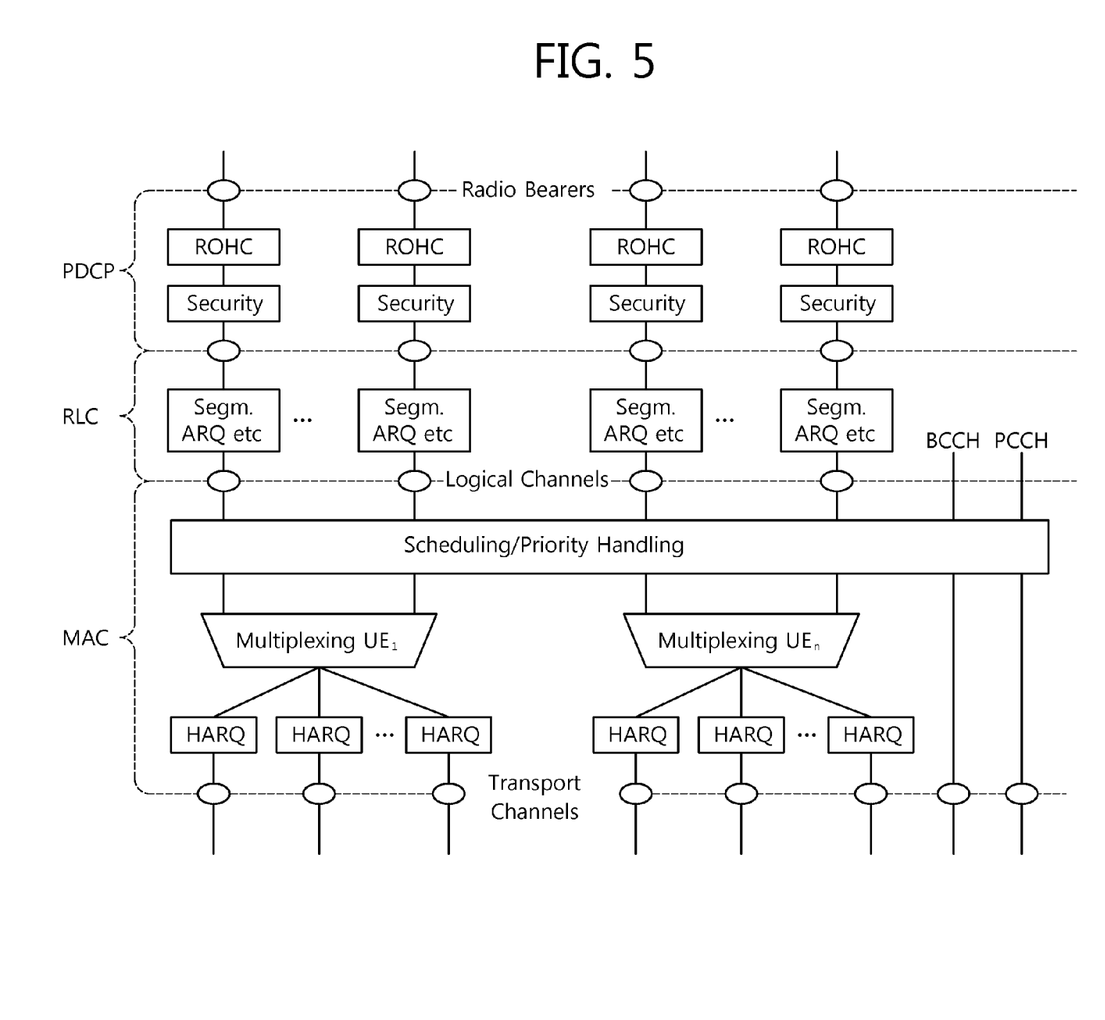
FIG. 5 shows a second-layer structure of a base station for multiple carriers.
Figure 6:
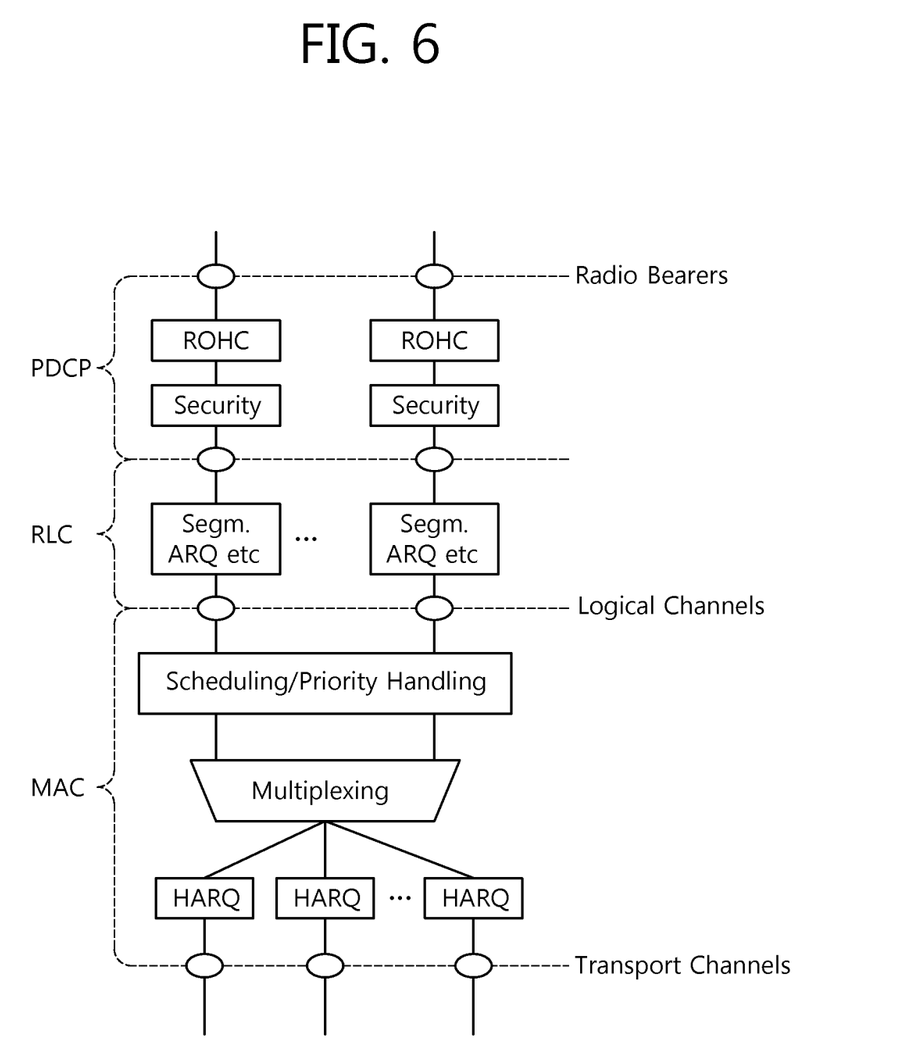
FIG. 6 shows a second-layer structure of a user equipment for multiple carriers.

FIG. 5 shows a second-layer structure of a BS for multiple carriers. FIG. 6 shows a second-layer structure of a UE for multiple carriers.

A MAC layer can manage one or more CCs. One MAC layer includes one or more HARQ entities. One HARQ entity performs HARQ on one CC. Each HARQ entity independently processes a transport block on a transport channel. Therefore, a plurality of HARQ entities can transmit or receive a plurality of transport blocks through a plurality of CCs.

One CC (or a CC pair of a downlink CC and an uplink CC) may correspond to one cell. When a synchronous signal and system information are provided by using each downlink CC, it can be said that each downlink CC corresponds to one serving cell. When the UE receives a service by using a plurality of downlink CCs, it can be said that the UE receives the service from a plurality of serving cells.

The BS can provide the plurality of serving cells to the UE by using the plurality of downlink CCs. Accordingly, the UE and the BS can communicate with each other by using the plurality of serving cells.

Since the plurality of serving cells have different center frequencies, uplink time alignment needs to be regulated for each serving cell.

However, an overhead caused by signaling for transmission of a time alignment value may increase in proportion to the number of serving cells. If the time alignment value for one serving cell can be transmitted using one MAC CE similarly to the conventional 3GPP LTE, it is required to transmit 4 MAC CEs to maintain the uplink time alignment for 4 serving cells.

According to a frequency property of the serving cells, there may be serving cells having similar time alignment properties. The similar time alignment property implies that the serving cells have similar time alignment values. For example, serving cells using contiguous frequency bands may have the similar time alignment properties.

A method for optimizing signaling for uplink time alignment regulation between serving cells having similarly time alignment properties is proposed.

According to the present invention, a method of grouping serving cells by using similarities in the change of time alignment and managing a timing alignment command for each group will be proposed.

Management of the timing alignment command proposed for each group can be allowed if carrier aggregation is possible.

Management of the timing alignment command proposed for each group can be allowed if a plurality of time alignment values are required.

Grouping of the serving cells may be performed by the BS. The BS may report the grouping result to the UE. The BS determines a specific time alignment group to which each serving cell is included, and reports group information to the UE. The group information may be transmitted to the UE by using an RRC message, a MAC message, and/or a PDCCH message.

Each of the UE and the BS may perform grouping by using a pre-defined method. Information related to the pre-defined method may be transmitted by the BS to the UE by using the RRC message, the MAC message, and/or the PDCCH message.

The pre-defined method may be based on a frequency band of each serving cell. It is defined that serving cells using a frequency band included in a specific frequency band belong to the same time alignment group. For example, it is assumed that frequencies X1 and X2 are included in a frequency band X, and frequencies Y1 and Y2 are included in a frequency band Y. Further, it is also assumed that a 1st serving cell using the frequency X1 and a 2nd serving cell using the frequency Y1 are assigned to the UE. If the BS additionally assigns a 3rd serving cell which uses the frequency Y2 to the UE, the UE and the BS may determine that the 3rd serving cell is included in the same time alignment group as the 2nd serving cell.

The time alignment group includes one or more serving cells (or CCs) which use the same time alignment value to maintain uplink time alignment.

A time alignment value for a specific time alignment group is valid only for serving cells of the time alignment group.

The time alignment group can be identified by using a time alignment group identifier (ID). The BS may allocate the time alignment group ID to which the serving cell belongs, when assigning the serving cell to the UE. The UE and the BS determine that serving cells which use the same time alignment group ID are included in the same time alignment group.

The BS may transmit the time alignment group ID together when sending a time alignment value for a specific time alignment group to the UE. The UE may apply the time alignment value to the serving cells identified by the time alignment group ID.

The time alignment group ID can be expressed by using various methods.

In one embodiment, a logical channel ID (LCID) included in a MAC sub-header may be used as the time alignment group ID for each time alignment group. As shown in FIG. 7, a MAC protocol data unit (PDU) includes a MAC header, a MAC service data unit (SDU), and a MAC CE. The MAC header includes at least one MAC sub-header.

Time alignment groups are mapped to respective logical channel IDs. The MAC CE including a time alignment value and the MAC sub-header including the LCID are included in the MAC PDU. Upon receiving the MAC PDU, the UE identifies the time alignment group on the basis of the LCID, and applies the time alignment value to serving cells included in the time alignment group.

Figure 9:
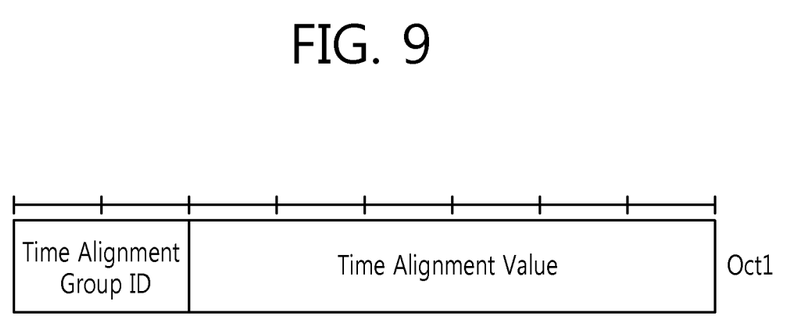
FIG. 9 shows an example of a MAC control element (CE) including a time alignment group identifier.

In another embodiment, some of bits included in the MAC CE may be used as the time alignment group ID. Since 2 bits are reserved in the MAC CE indicating the previous time alignment value, the reserved bits may be used as the time alignment group ID. FIG. 9 shows an example of the MAC CE including the time alignment group ID.

In another embodiment, the time alignment group ID may be a bitmap indicating a time alignment value for each time alignment group.

Figure 10:
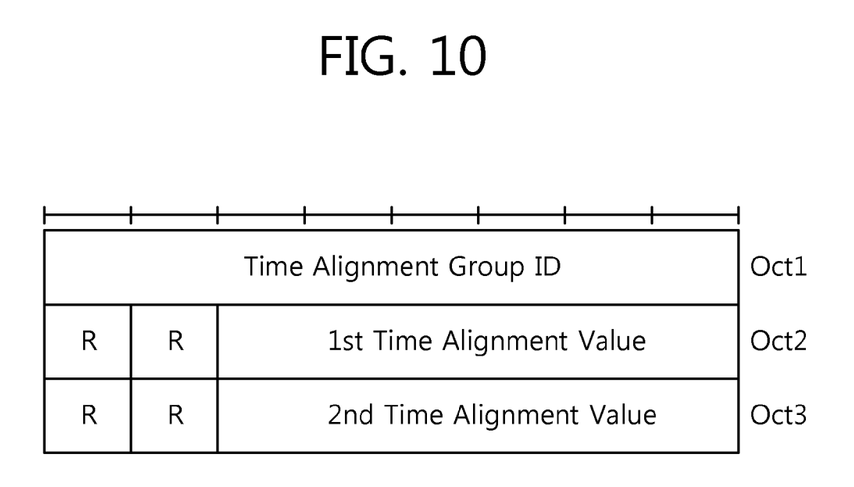
FIG. 10 shows an example of a time alignment group identifier using a bitmap.

FIG. 10 shows an example of a time alignment group ID using a bitmap. Assume that there are two time alignment groups. A MAC CE includes a 1st time alignment value for a 1st time alignment group and a 2nd time alignment value for a 2nd time alignment group. A time alignment group ID having a bitmap '10' indicates the 1st time alignment group. A time alignment group ID having a bitmap '01' indicates the 2nd time alignment group.

To determine a time alignment group to which the time alignment value is applied, a UE may use information regarding a serving cell in which the time alignment value is received. Assume that a time alignment group to which each serving cell belongs is pre-known to both the UE and a BS. The BS transmits the time alignment value to the UE by using a serving cell belonging to a specific time alignment group. The UE applies the time alignment value to serving cells belonging to the time alignment group including the serving cell in which the time alignment value is received.

Figure 11:
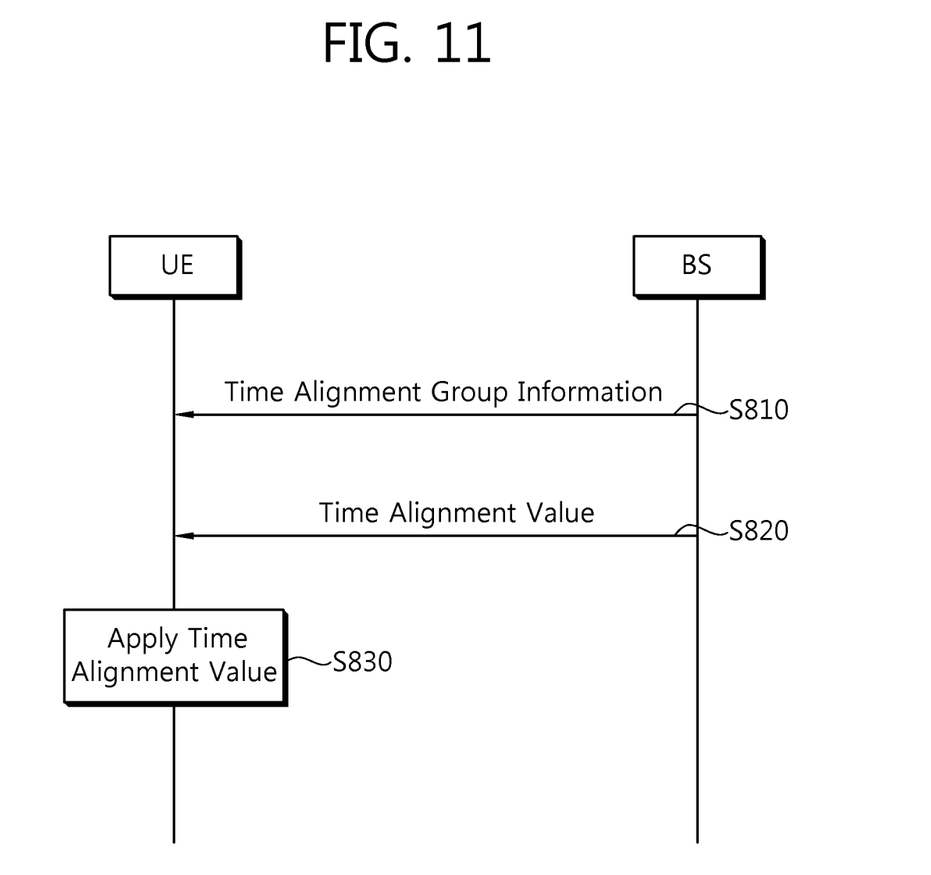
FIG. 11 is a flowchart showing a method of maintaining uplink time alignment according to an embodiment of the present invention.

FIG. 11 is a flowchart showing a method of maintaining uplink time alignment according to an embodiment of the present invention.

A BS delivers time alignment group information to a UE (step S810). The time alignment group information may include information regarding a plurality of time alignment groups including at least one serving cell. When the serving cell is added or modified by using an RRC connection reconfiguration message, the BS may transmits information regarding a time alignment group including the serving cell to the UE. The time alignment group information may include a time alignment group ID.

One time alignment timer runs for each time alignment group. After being completely connected to the BS, the UE may apply a time alignment value included in a random access response and then may start the time alignment timer.

When there is a need to regulate uplink time alignment of a specific serving cell or serving cells belonging to a specific time alignment group, the BS transmits the time alignment value to the UE (step S820). While the time alignment timer is running, the time alignment value may be transmitted by being included in a MAC PDU and/or the random access response. The time alignment group ID may be transmitted to the UE in addition to the time alignment value.

The UE applies the time alignment value to serving cells belonging to the time alignment group (step S830). The UE may use the aforementioned method of determining the time alignment group to determine a time alignment group to which the time alignment value is applied. The time alignment group can be identified by the time alignment group ID. Alternatively, the time alignment group can be determined based on a serving cell in which the time alignment value is transmitted.

When the time alignment value is applied, the UE starts or restarts a time alignment timer of the time alignment group. At the expiry of the time alignment timer, the UE may inactivate serving cells in the time alignment group or may release an uplink resource. The UE does not transmit any other uplink signals except for a random access preamble to inactive serving cells until receiving a command for activating the inactive serving cells from the BS.

Figure 12:
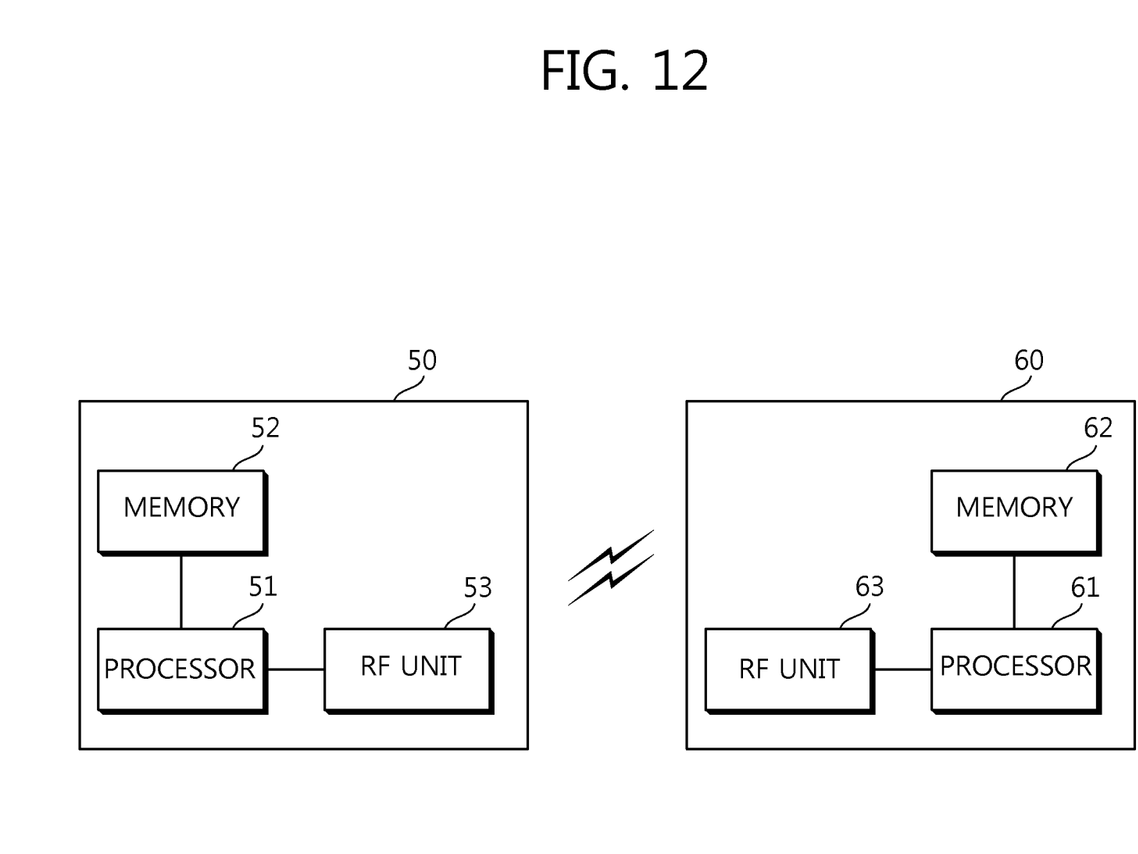
FIG. 12 is a block diagram showing a wireless communication system for implementing an embodiment of the present invention.

FIG. 12 is a block diagram showing a wireless communication system for implementing an embodiment of the present invention.

A BS 50 includes a processor 51, a memory 52, and a radio frequency (RF) unit 53. The memory 52 is coupled to the processor 51, and stores a variety of information for driving the processor 51. The RF unit 53 is coupled to the processor 51, and transmits and/or receives a radio signal. The processor 51 implements the proposed functions, procedures, and/or methods. In the embodiment of FIG. 11, the operation of the BS 50 can be implemented by the processor 51.

A UE 60 includes a processor 61, a memory 62, and an RF unit 63. The memory 62 is coupled to the processor 61, and stores a variety of information for driving the processor 61. The RF unit 63 is coupled to the processor 61, and transmits and/or receives a radio signal. The processor 61 implements the proposed functions, procedures, and/or methods. In the embodiment of FIG. 11, the operation of the UE 60 can be implemented by the processor 61.

The processor may include application-specific integrated circuit (ASIC), other chipset, logic circuit and/or data processing device. The memory may include read-only memory (ROM), random access memory (RAM), flash memory, memory card, storage medium and/or other storage device. The RF unit may include baseband circuitry to process radio frequency signals. When the embodiments are implemented in software, the techniques described herein can be implemented with modules (e.g., procedures, functions, and so on) that perform the functions described herein. The modules can be stored in memory and executed by processor. The memory can be implemented within the processor or external to the processor in which case those can be communicatively coupled to the processor via various means as is known in the art.

In view of the exemplary systems described herein, methodologies that may be implemented in accordance with the disclosed subject matter have been described with reference to several flow diagrams. While for purposed of simplicity, the methodologies are shown and described as a series of steps or blocks, it is to be understood and appreciated that the claimed subject matter is not limited by the order of the steps or blocks, as some steps may occur in different orders or concurrently with other steps from what is depicted and described herein. Moreover, one skilled in the art would understand that the steps illustrated in the flow diagram are not exclusive and other steps may be included or one or more of the steps in the example flow diagram may be deleted without affecting the scope and spirit of the present disclosure.

The invention claimed is:

1. A method of receiving a timing advance command by a user equipment in a wireless communication system, the method comprising:
    receiving information related to a time alignment group through a radio resource control (RRC) signaling from a base station before receiving the timing advance command;
    receiving the timing advance command corresponding to the time alignment group from the base station; and
    applying the timing advance command to at least one serving cell belonging to the time alignment group,
    wherein the timing advance command is received together with a time alignment group identifier after receiving the information related to the time alignment group through the RRC signaling,
    wherein the time alignment group identifier identifies the time alignment group to which the timing advance command is applied, and
    wherein the time alignment group identifier is included in a medium access control (MAC) control element (CE).

2. The method of claim 1, wherein the time alignment group is a time advance group.

3. The method of claim 1, wherein the time alignment group identifier is a time advance group identifier.

4. The method of claim 1, wherein the time alignment group identifier is a logical channel identifier.

5. The method of claim 1, wherein the time alignment group is determined based on a serving cell in which the timing advance command is received.

6. The method of claim 1, wherein the applying of the timing advance command to the at least one serving cell belonging to the time alignment group comprises restarting an uplink alignment timer for the time alignment group.

7. The method of claim 1, wherein the timing advance command is for uplink time alignment.

8. A method of transmitting a timing advance command by a base station in a wireless communication system, the method comprising:
    transmitting information related to a time alignment group to a user equipment through a radio resource control (RRC) signaling, the information being transmitted to the user equipment before transmitting the timing advance command; and
    transmitting the timing advance command corresponding to the time alignment group to the user equipment, the user equipment applying the timing advance command to at least one serving cell belonging to the time alignment group,
    wherein the timing advance command is transmitted together with a time alignment group identifier after transmitting the information related to the time alignment group through the RRC signaling,
    wherein the time alignment group identifier identifies the time alignment group to which the timing advance command is applied, and
    wherein the time alignment group identifier is included in a medium access control (MAC) control element (CE).

9. The method of claim 8, wherein the time alignment group is a time advance group.

10. The method of claim 8, wherein the time alignment group identifier is a time advance group identifier.

11. The method of claim 8, wherein the time alignment group identifier is a logical channel identifier.

12. The method of claim 8, wherein the time alignment group is determined based on a serving cell in which the timing advance command is transmitted.

13. The method of claim 8, wherein the timing advance command is for uplink time alignment.

\* \* \* \* \*